July 17, 1956

N. E. L. MEANS 2,754,612

SIMULATED NATURAL INSECT FISHING
LURE AND METHOD OF MAKING
Filed Aug. 5, 1952

Fig. 6

*INVENTOR.*
NORMAN E. L. MEANS

BY

*Kenway, Jenney, Witter & Hildreth*

ATTORNEYS

United States Patent Office 2,754,612
Patented July 17, 1956

2,754,612

SIMULATED NATURAL INSECT FISHING LURE AND METHOD OF MAKING

Norman E. L. Means, Missoula, Mont.

Application August 5, 1952, Serial No. 302,656

2 Claims. (Cl. 43—42.25)

This invention relates to fishing lures and more particularly to an improved lure adapted to simulate a natural insect, and to a novel method of making the lure. My improved lure embodies various novel features, all adapted to render the lure more life-like and natural and more successfully to serve the functions of attracting and hooking the fish.

Aquatic insects skim across the water and beat their wings when laying their eggs and other insects, as horse flys, bees, moths, etc. beat their wings to keep from drowning when they fall into the water. This movement on the surface of the water attracts the fish which rise to the surface and grab the insects. The primary object of my invention resides in a new and improved lure that will be more natural in appearance and action and serve better to attract and hook the fish.

My improved lure employs a body of cork or the like and one feature of the invention resides in a novel method of giving the body the natural appearance of the insect it is made to simulate. A further feature of the invention resides in so mounting the wings on the body that they extend upwardly therefrom similar to an insect in flight, and in so mounting the hook in the body that it extends downwardly therefrom in position to hook the fish striking from beneath. As illustrated in the drawing and hereinafter more fully described, this novel construction ordinarily results in positioning the hook downwardly and the wings upwardly when the lure is cast onto the water and in causing the lure to rock sideways and give a wing beating effect as the lure is drawn through the water. The production of an improved lure embodying these features as and for the purpose described comprises a further object of the invention.

These and other features of the invention will be more readily understood and appreciated from the following detailed description of a preferred embodiment thereof selected for purposes of illustration and shown in the accompanying drawing in which:

Fig. 6 illustrates a thin paper sheet having the back and belly patterns of an insect printed thereon and which patterns are to be applied to the body of the lure shown in Fig. 5.

Figure 1:
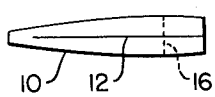
Fig. 1 is a bottom plan view of a cork body employed in making the lure.
Figure 2:
Fig. 2 is a side elevation of Fig. 1.
Figure 3:
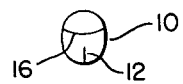
Fig. 3 is a front end view of the body.
Figure 4:
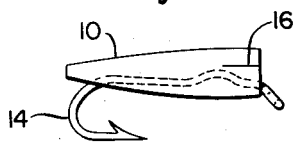
Fig. 4 is a side elevation of the body with the hook applied.

The body 10 of my improved lure is constructed of cork or like buoyant material. The body is slitted at 12 to receive a hook 14 which normally extends downwardly from the body when the lure is in use on the water. A U-shaped slit 16 extends into the body from its forward end for receiving and suporting the wings 18. This slit is formed by a small tubular saw having a diameter giving the slit curvature required. The wings preferably comprise relatively fine and stiff hairs which are inserted into the slit and project laterally upwardly and outwardly from opposite sides of the body. The exterior surface of the body is then given the appearance of a specific natural insect by my novel method now to be described.

Trout, bass and other game fish feed on various insects at different seasons and one object of the invention is to provide a lure that will simulate the true markings and patterns of these insects. I proceed by catching good specimens of the desired insects and then make an accurate drawing of each. Since the back and belly markings of each insect are different, I preferably make two drawings, back and belly, of each. I then have made from each drawing a cut that can be used to print the pattern on smooth and close-grained paper 20, preferably having the texture of tissue toilet paper.

Figure 5:
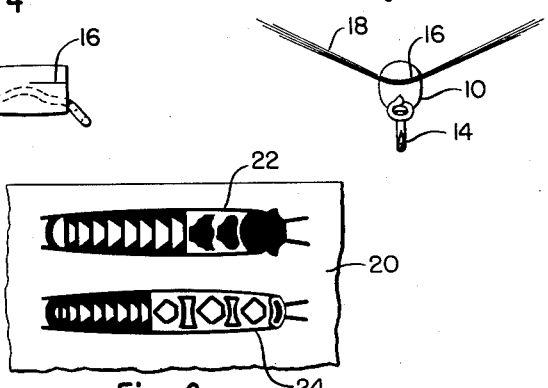
Fig. 5 is a front end view of the body with the hook and wings applied.
Figure 7:
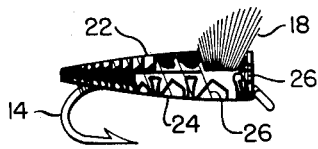
Fig. 7 is a side elevation of the completed lure.
Figure 8:
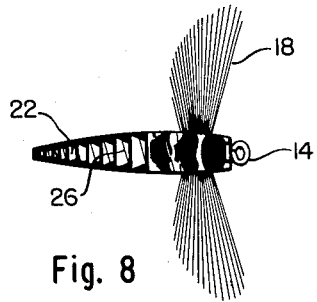
Fig. 8 is a plan view.

The back and belly prints 22 and 24 of the insect to be employed are cut out and adhesively applied to the back and belly halves of the body 10 shown in Fig. 5. I then suitably wind fine silk thread 26 over the body to secure all parts into a unit. The body is then coated with a substantially transparent and hard drying waterproof sealing agent, such as varnish or lacquer, adapted to harden and form a protective coating over the body. Two such coats are preferably applied and I have found spar varnish very satisfactory for this purpose. The toilet paper preferably used readily absorbs and becomes a part of the varnish when the second coat is applied and the oils in the varnish dissipate the white opaque character of the toilet paper and leave the printed markings standing out prominently on the body.

While the patterns can be printed substantially in the true colors of the insect and thus truly simulate the pattern markings, I preferably make the patterns in black (or brown) and white and paint in the required additional colors. These colors can be painted in either before or after the protective coatings have been applied.

The relative positions of the hook extending downwardly from the body and the wings extending upwardly therefrom are of major importance in maintaining the lure in proper position and balance both during casting and while the lure is on the water. Due to the relatively heavy and downwardly extending hook and the upwardly extending pitch of the wings, the lure ordinarily lights in the water in the most natural manner, namely, with the hook down and the wings up. Should the lure alight otherwise or be turned over in rough water, it will readily right itself, especially if given a slight twitch by the line. Thus the hook serves as a balancing keel for the lure and, together with the light upwardly extended wings, normally maintains the lure in proper position in both air and water. The downwardly extending hook also serves with maximum efficiency to make the catch when the fish strikes. The relatively high and upwardly extending wings furthermore cooperate with the hook to maintain the balance of the lure on the water to the most lifelike position and also aid the fisherman in observing the lure especially in rough water. The latter substantially increases the chances of setting the hook at the right time.

Figure 9:
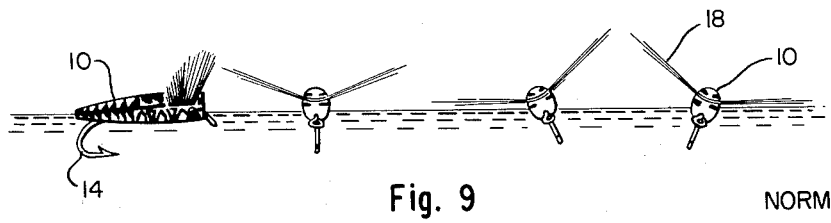
Fig. 9 illustrates the action of the lure in use on the surface of the water.

After the cast is made, the line is tickled sufficiently to give slight jerks to the lure. This movement causes the lure to move forwardly in the water and rock from side to side in a manner simulating the beating of the wings by the natural insect, as illustrated in Fig. 9 of the drawing. This feature of the invention together with the features of natural appearance and causing the lure to alight upright on the water and keep the hook pointed downwardly are extremely important and are believed to render my improved lure far more natural and effective than any lure heretofore known.

Having thus disclosed my invention what I claim as new and desire to secure by Letters Patent is:

1. A simulated natural insect fishing lure comprising an oblong body of cork or the like having therein a slit which is U-shaped transversely and which extends from its forward end rearwardly, a hook mounted in the body with the hook eye end projecting outwardly at the forward end of the body beneath the convex side of the slit and the sharp end projecting outwardly and forwardly at the rear of the eye, fine and stiff hairs in the slit transversely of the body and supported thereby in position projecting outwardly and diverging upwardly therefrom at both sides of the body to simulate wings, means including thin sheet material adhesively secured to the body and providing in natural colors thereon a true reproduction pattern of the body of a natural insect, said means comprising two back and belly pattern halves in juxtaposed and complemental relation to simulate the insect, and means including fine thread disposed around the body and a coating of transparent and waterproof sealing agent thereover securing and protecting the lure.

2. The method of making a simulated natural insect fishing lure, consisting of providing on paper and in complemental back and belly pattern halves a true reproduction pattern in natural colors of the body of a natural insect to be simulated, providing a body of cork or the like shaped to receive the pattern, slitting the body transversely and longitudinally with a U-shaped slit, placing hairs transversely in and through the slit to define lateral wings deflected upwardly at both sides of the body, mounting a hook on the body, adhesively applying the back and belly halves of the pattern in complemental arrangement to the body to simulate the insect, wrapping fine thread around the pattern and body to secure the lure elements into a unit, and coating the wrapped body with a substantially transparent and hard-drying waterproof sealing agent adapted to harden and form a protective coating over the body.

References Cited in the file of this patent
UNITED STATES PATENTS

| | | |
|---|---|---|
| 1,309,061 | Cassedy | July 8, 1919 |
| 1,385,627 | Lane | July 26, 1921 |
| 1,881,285 | Means | Oct. 4, 1932 |